3,322,780
α-(ACINITROMETHYL)- AND α-(NITROMETHYL)-2,
1,3 - BENZOTHIADIAZOLE - METHANOL COM-
POUNDS
Richard Y. Wen, Midland, Mich., assignor to The Dow
Chemical Company, Midland, Mich., a corporation of
Delaware
No Drawing. Filed Sept. 3, 1965, Ser. No. 485,076
7 Claims. (Cl. 260—304)

The present invention is directed to a benzothiadiazole compound of one of the formulae I
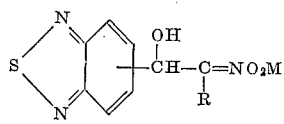

and

II
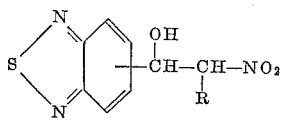

In the above and succeeding formulae, R represents hydrogen, primary loweralkyl, or secondary loweralkyl; and M represents alkali metal. The products of the present invention are crystalline solid materials. Those of Formula I are moderately soluble in water and of low solubility in organic solvents; those of Formula II are of low solubility in water and of moderate solubility in organic solvents such as acetone, benzene, and the loweralkanols. The products of Formula II are useful as fungicides and as herbicides, the products of Formula I, as intermediates in the preparation of the products of Formula II. In the present specification and claims, the terms "primary loweralkyl" and "secondary loweralkyl" are employed to designate alkyl radicals being of from 1 to 5 carbon atoms and having, as the carbon atom of attachment, a primary (—CH$_2$—) or (—CH—)

respectively, carbon atom; and the term "alkali metal" is employed to designate sodium, potassium, and lithium. Representative primary and secondary loweralkyl radicals include methyl, ethyl, n-propyl, n-butyl, n-pentyl, isopropyl, isobutyl, isopentyl, sec-butyl, sec-pentyl, 2-methyl-n-butyl, 2,2-dimethyl-n-propyl, and 1,2-dimethyl-n-propyl.

All of the products of the present invention are prepared in the condensation reaction of a benzothiadiazole-carboxaldehyde reactant of the formula

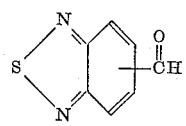

with a nitroalkane reactant of the formula R—CH$_2$NO$_2$. The reaction is carried out under basic conditions, typically provided by the addition of alkali metal hydroxide. This condensation reaction yields initially the products of Formula I; upon acidification of the products of Formula I, the corresponding products of Formula II are obtained. The course the reaction is considered to take is illustrated by the following reaction scheme:

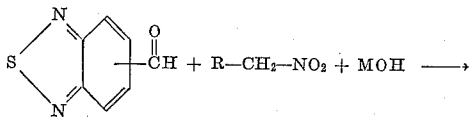

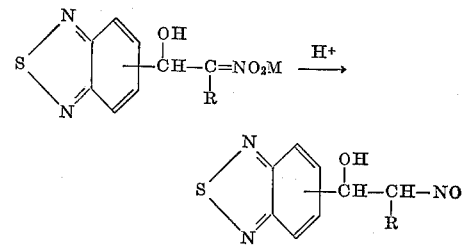

The reaction is exothermic and goes forward under temperatures of a wide range, such as from —10° to 60° C.; however, the =NO$_2$M group of the products of Formula I is relatively unstable when subjected to heat. Therefore, it is preferred to conduct the reaction at temperatures of from —10° to 30° C.

The reaction is carried out in an inert liquid reaction medium, typically an organic liquid or the combination of an organic liquid and water. The identity of the liquid or liquids employed as reaction medium is not critical, except that all of the materials employed in the reaction be soluble therein. Generally, the alkali metal hydroxide is employed as an aqueous solution, and in that instance, a water-miscible organic liquid is employed as solvent for the benzothiadiazolecarboxaldehyde and nitroalkane materials, to induce homogeneity of the reaction mixture. However, the benzothiadiazolecarboxaldehyde reactant is of low solubility in certain water-miscible organic liquids, in particular, the loweralkanols; it is therefore preferable to employ as reaction medium a solvent comprising a loweralkanol and, as solvent in particular for the benzothiadiazolecarboxaldehyde reactant, a cyclic ether such as dioxane or tetrahydrofuran. In other instances, in particular when it is desired to separate the products of Formula I, a non-aqueous system is employed; in this instance, the alkali metal hydroxide is employed as a non-aqueous solution, typically as a solution in a loweralkanol such as methanol or ethanol, and any organic liquid in which the benzothiadiazolecarboxaldehyde and nitroalkane reactants are soluble is employed. Preferably, a cyclic ether such as dioxane or tetrahydrofuran is used.

The reaction goes forward when the benzothiadiazolecarboxaldehyde reactant and the nitroalkane reactant are present in any amounts, although the reaction consumes the materials in amounts which represent equimolecular proportions. Higher yields are obtained when employing the nitroalkane reactant in excess, such as a one- to ten-fold excess. The amount of alkali metal hydroxide employed is not critical, it being necessary only that sufficient amount be added that the reaction mixture is basic. In general, it is preferred to employ a dilute alkali metal hydroxide solution, because the dilution has the effect of controlling the rate of reaction and preventing local overheating. The degree of dilution of the alkali metal hydroxide is not critical; 5 to 25 percent solutions are conveniently used.

In carrying out the reaction, the benzothiadiazolecarboxaldehyde and nitroalkane reactants are brought together in the reaction medium and the reaction mixture thereafter made basic by the addition thereto of the alkali metal hydroxide. The reaction is exothermic and goes forward readily upon the addition of the alkali metal hydroxide, with the preparation of the desired product of Formula I, which is soluble in the instance of an aqueous reaction mixture and insoluble in the instance of a non-aqueous reaction mixture. The temperature of the reaction mixture during the addition can be controlled by portionwise addition of the alkali metal hydroxide and by external cooling. The reaction is essentially complete upon the completion of the addition of the alkali metal hydroxide. The resulting reaction mixture can be permitted to stand for a period of time; however, due to the relative instability of the =NO₂M moiety, it is preferred that temperatures of from −10° to 30° C. be maintained throughout any such period.

When a non-aqueous reaction mixture has been employed, in order to permit of ready separation of the product of Formula I, such product appears as a precipitate in the reaction mixture and can be separated by filtration or decantation. Otherwise, the aqueous or non-aqueous reaction mixture, which preferably is continued to be maintained by external cooling in the −10° to 30° C. temperature range, is made slightly acidic, that is, brought to a pH of about 4–7. Typically, this is done by the addition of a dilute solution of a weak acid, such as acetic acid, butyric acid, citric acid, or oxalic acid. As a result of the acidification, the corresponding product of Formula II is prepared.

This product appears in an aqueous reaction mixture as a crystalline solid precipitate. Therefore, the product is separated from the reaction by filtration or decantation, and can be employed as separated for the useful purposes of the present invention. However, if desired, the separated product can be purified by conventional procedures such as recrystallization.

The following examples set forth the best mode now known for practicing the present invention and will enable those skilled in the art to practice the present invention. In the examples, the products of Formula I are identified, in accordance with Chemical Abstracts practice, as alkali metal derivatives of the "acinitro" group.

*Example 1.—α-(Acinitromethyl)-2,1,3-benzothiadiazole-5-methanol, sodium derivative*

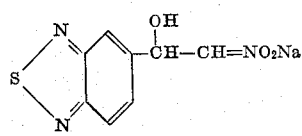

A mixture of 60 grams of 2,1,3-benzothiadiazole-5-carboxaldehyde (0.365 mole), 540 milliliters of tetrahydrofuran, 56 grams of nitromethane (0.917 mole), and 180 milliliters of 95 percent ethanol was cooled, with agitation, to a temperature of 2°–3° C. with an ice bath. A 10 percent sodium hydroxide solution, in the amount of 200 milliliters, was added to the cooled mixture. The addition was carried out portionwise over a period of time, and the use of an ice bath was continued so that the temperature of the reaction mixture remained at all times below about 15° C.

As a result of these operations, α-(acinitromethyl)-2,1,3-benzothiadiazole-5-methanol, sodium derivative, was prepared in the reaction mixture.

*Example 2. — α-(Nitromethyl)-2,1,3-benzothiadiazole-5-methanol, dl*

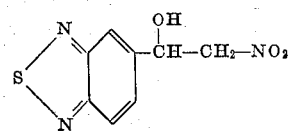

To the cooled reaction mixture of Example 1, containing the α-(acinitromethyl)-2,1,3-benzothiadiazole-5-methanol, sodium derivative product, 1650 milliliters of a 5 percent acetic acid solution was added. The resulting mixture was placed in a refrigerator at a temperature of about 0° C. for about 14 hours. Thereafter, the α-(nitromethyl)-2,1,3-benzothiadiazole-5-methanol, dl product was separated from the mixture by filtration. The separated product was recrystallized from a mixture of 55 milliliters of methyl ethyl ketone and 480 milliliters of benzene. The purified product was a white crystalline solid melting at 122°–4° C.

Similarly, other representative products of the present invention are prepared as follows:

2,1,3-benzothiadiazole-4-carboxaldehyde, nitromethane, and lithium hydroxide are reacted together to obtain α - (acinitromethyl) - 2,1,3 - benzothiadiazole - 4 - methanol, lithium derivative, and α-(nitromethyl)-2,1,3-benzothiadiazole-4-methanol.

2,1,3 - benzothiadiazole - 5 - carboxaldehyde, nitroethane, and potassium hydroxide are reacted together to obtain α - (1 - acinitroethyl) - 2,1,3 - benzothiadiazole - 5-methanol, potassium derivative, and α-(1-nitroethyl)-2,1,3-benzothiadiazole-5-methanol.

2,1,3 - benzothiadiazole - 4 - carboxaldehyde, 1 - nitro-2-methyl-n-propane, and sodium hydroxide are reacted together to obtain α-(1-acinitro-2-methyl-n-propyl)-2,1-3-benzothiadiazole-4-methanol, sodium derivative, and α-(1-nitro - 2 - methyl - n - propyl) - 2,1,3 - benzothiadiazole-4-methanol.

2,1,3 - benzothiadiazole - 5 - carboxaldehyde, 1 - nitrohexane, and potassium hydroxide are reacted together to obtain α - (1 - acinitrohexyl) - 2,1,3 - benzothiadiazole-5-methanol, potassium derivative, and α-(1-nitrohexyl)-2,1,3-benzothiadiazole-5-methanol.

Yet other products are: α-(1-nitro-n-propyl)-2,1,3-benzothiadiazole - 5 - methanol; α - (1 - nitro - 2 - methyl-n - butyl) - 2,1,3 - benzothiadiazole - 4 - methanol; α-(1 - acinitro - 3,3 - dimethyl - n - butyl) - 2,1,3 - benzothiadiazole-5-methanol, sodium derivative; and α-(1-nitron-butyl)-2,1,3-benzothiadiazole-4-methanol.

The products of Formula II as prepared in accordance with the foregoing exist as a racemic mixture of d- and l-forms. When desired, such a mixture can be resolved into the respective forms by conventional procedures. Typically, the product is converted into an ester with the acid moiety of an optically active carboxylic acid in one of its pure enantiomorphic forms. The resulting diastereomers, having differing physical properties, are readily separated; thereafter, each is separately hydrolyzed with base; as a result of these operations, the d- and l-forms of the product are obtained as separate materials.

In the fungicidal application of products of the present invention, an unmodified product can be employed. However, the present invention also encompasses the use of a product together with an adjuvant. Thus, the product can be dispersed on a finely divided solid and the resulting preparation employed as a dust. Also, the product can be dispersed in water, or employed as a constituent of organic liquid compositions or oil-in-water or water-in-oil emulsions, with or without the addition of wetting dispersing, or emulsifying agents. In representative operations, an aqueous composition containing 100 parts of α-(nitromethyl)-2,1,3-benzothiadiazole-5-methanol, dl per million parts by weight of ultimate aqueous composition was applied to a group of host plants, and the plants thereafter inoculated with spores of apple scab fungus. Another group of host plants was left untreated but was similarly inoculated. Both groups were held for a period of time following inoculation under conditions conducive to the growth of apple scab. At the end of the period, the check group exhibited a heavy infestation of apple scab, whereas the treated group was essentially free of apple scab.

The 2,1,3-benzothiadiazole-4-carboxaldehyde and 2,1,3-benzothiadiazole-5-carboxaldehyde starting materials are prepared in known procedures wherein a 4- or 5-methyl-2,1,3-benzothiadiazole is reacted with N-bromosuccinimide to obtain the corresponding 4- or 5-(bromomethyl) compound. This compound is then reacted with hexamethylenetetramine to form the corresponding salt, which is refluxed with 50 percent acetic acid, cooled, and the precipitate recrystallized from methanol, to yield the desired starting material.

The materials which are employed as nitroalkane (R—CH₂—NO₂) reactant are prepared in known procedures; many of them are commercially available. Typically, a simple alkane, or a mixture of alkanes, is nitrated by contact, at high temperature (400° F.), with nitric acid vapor. The result is a mixture of mononitro products, which mixture can be separated into its components by conventional procedures, typically fractional distillation or separation by the use of vapor phase chromatography.

I claim:

1. Compound of the formula

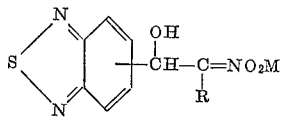

wherein R represents hydrogen, primary loweralkyl being of from 1 to 5, both inclusive, carbon atoms, or secondary loweralkyl being of from 3 to 5, both inclusive, carbon atoms and M represents alkali metal.

2. The compound of claim 1 in which R represents hydrogen.

3. The compound of claim 2 in which M represents sodium.

4. The compound of claim 3 in which the moiety

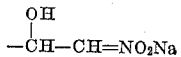

is located at the 5-position of the 2,1,3-benzothiadiazole ring.

5. Compound of the formula

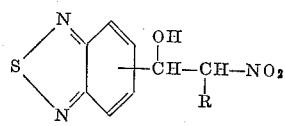

wherein R represents hydrogen, primary loweralkyl being of from 1 to 5, both inclusive, carbon atoms, or secondary loweralkyl being of from 3 to 5, both inclusive, carbon atoms.

6. The compound of claim 5 in which R represents hydrogen.

7. The compound of claim 6 in which the moiety

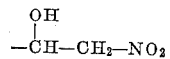

is located at the 5-position of the 2,1,3-benzothiadiazole ring.

No references cited.

ALEX MAZEL, *Primary Examiner.*

RICHARD J. GALLAGHER, *Assistant Examiner.*